United States Patent
Hamada et al.

(10) Patent No.: US 10,072,774 B2
(45) Date of Patent: Sep. 11, 2018

(54) INTERMEDIATE GRASPING TOOL OF CHARGING CABLE

(75) Inventors: Mitsuharu Hamada, Zama (JP); Masato Inoue, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 669 days.

(21) Appl. No.: 14/343,874

(22) PCT Filed: Sep. 3, 2012

(86) PCT No.: PCT/JP2012/072376
§ 371 (c)(1),
(2), (4) Date: Mar. 10, 2014

(87) PCT Pub. No.: WO2013/035673
PCT Pub. Date: Mar. 14, 2013

(65) Prior Publication Data
US 2014/0209354 A1    Jul. 31, 2014

(30) Foreign Application Priority Data
Sep. 11, 2011    (JP) .................................. 2011-197763

(51) Int. Cl.
*F16L 3/01*    (2006.01)
*B60L 11/18*    (2006.01)

(52) U.S. Cl.
CPC ............. *F16L 3/01* (2013.01); *B60L 11/1818* (2013.01); *B60L 11/1825* (2013.01);
(Continued)

(58) Field of Classification Search
CPC ...... H02G 3/26; H02G 11/00; B60R 16/0215; F16L 3/01; B60L 11/1818; B60L 11/1825; B60L 2210/10; B60L 2210/30; B60L 2230/12; B60L 2270/32; B60L 2270/34; Y02T 10/7005; Y02T 90/121;
(Continued)

(56) References Cited

U.S. PATENT DOCUMENTS 3,211,828 A * 10/1965 Cloud, Jr. ................ H02G 1/00
                                                        174/135
4,805,479 A *  2/1989 Brightwell .................... 74/502.4
(Continued)

FOREIGN PATENT DOCUMENTS

| EP | 0019110 A1 | 11/1980 |
|---|---|---|
| JP | 55-147369 U | 10/1980 |
| JP | 3083658 U | 2/2002 |
| JP | 2010-114988 A | 5/2010 |
| JP | 2010-161886 A | 7/2010 |
| JP | 2011-111805 A | 6/2011 |

*Primary Examiner* — Pete Lee
(74) *Attorney, Agent, or Firm* — Young Basile Hanlon & MacFarlane, P.C.

(57) ABSTRACT

This intermediate grasping tool of a charging cable is mounted on a charging cable that extends from a charging stand, is provided with a cylindrical part which is hung on a hook provided on the charging stand and which is formed such that the charging cable passes through said cylindrical part, and is also provided with a gripping part which extends from the cylindrical part and is grasped. By means of such a configuration, charging operations can be performed while grasping the intermediate grasping tool of the charging cable with the hand that is not grasping the charging connector. In this way, the operability during charging can be improved.

3 Claims, 6 Drawing Sheets

(52) U.S. Cl.
CPC ....... *B60L 2210/10* (2013.01); *B60L 2210/30* (2013.01); *B60L 2230/12* (2013.01); *B60L 2270/32* (2013.01); *B60L 2270/34* (2013.01); *Y02T 10/7005* (2013.01); *Y02T 10/7088* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01)

(58) Field of Classification Search
CPC ... Y02T 90/7005; Y02T 90/14; Y02T 90/128; Y02T 90/127; Y02T 10/7088; Y02T 10/7241; Y02T 10/7216
USPC .......................................................... 174/135
See application file for complete search history.

(56) References Cited

U.S. PATENT DOCUMENTS

| | | | | |
|---|---|---|---|---|
| 5,511,442 | A | * | 4/1996 | Tame .................. F16C 1/14 74/502.6 |
| 5,536,173 | A | * | 7/1996 | Fujitani ............... B60L 11/1818 439/34 |
| 5,639,049 | A | * | 6/1997 | Jennings ................ F16L 3/123 24/563 |
| 6,459,234 | B2 | | 10/2002 | Kajiura |
| 6,595,472 | B1 | * | 7/2003 | Pisczak .................. H02G 7/053 248/74.1 |
| 6,871,732 | B2 | * | 3/2005 | Flint ..................... H02G 11/00 191/12 R |
| 2012/0193929 | A1 | * | 8/2012 | Karner .......................... 294/174 |

* cited by examiner

INTERMEDIATE GRASPING TOOL OF CHARGING CABLE

CROSS REFERENCE TO RELATED APPLICATION

The present application claims priority to Japanese Patent Application No. 2011-197763, filed Sep. 11, 2011, incorporated herein in its entirety.

TECHNICAL FIELD

The present invention relates to a middle gripper of a charging cable of a charging stand, attached to an intermediate part of the charging cable.

BACKGROUND

A charging stand for charging a battery of an electric vehicle has a charging cable led out of a housing of the charging stand. A front end of the charging cable is provided with a plug. For example, Japanese Unexamined Patent Application Publication No. 2010-114988 discloses a battery charging operation that a user grasps the plug, i.e., a charging connector and puts the same into a charging socket of the electric vehicle.

SUMMARY

Power supplied to the battery of an electric vehicle is very large, and therefore, the charging cable is required to have a voltage withstanding characteristic to deal with such large power and strength. Accordingly, a charging cable satisfying these requirements tends to be thick, hard, and heavy, and therefore, is difficult to handle at the time of charging.

The present invention has been made to solve the above-mentioned problem. An object of the present invention is to provide a middle gripper for a charging cable, capable of improving handling at the time of charging.

Namely, the present invention is a middle gripper attached to a charging cable extending from a charging stand. The middle gripper is formed to pass the charging cable therethrough and is provided with a cylindrical part to be put on a hook installed on the charging stand. It is also provided with a gripping part extending from the cylindrical part.

BRIEF DESCRIPTION OF DRAWINGS

The description herein makes reference to the accompanying drawings wherein like reference numerals refer to like parts throughout the several views, and wherein.

DETAILED DESCRIPTION OF EMBODIMENTS

A middle gripper for a charging cable according to an embodiment of the present invention will be explained in detail with reference to the drawings. The scale of the drawings is exaggerated for the sake of explanation, and therefore, differs from actual one.

Figure 1:
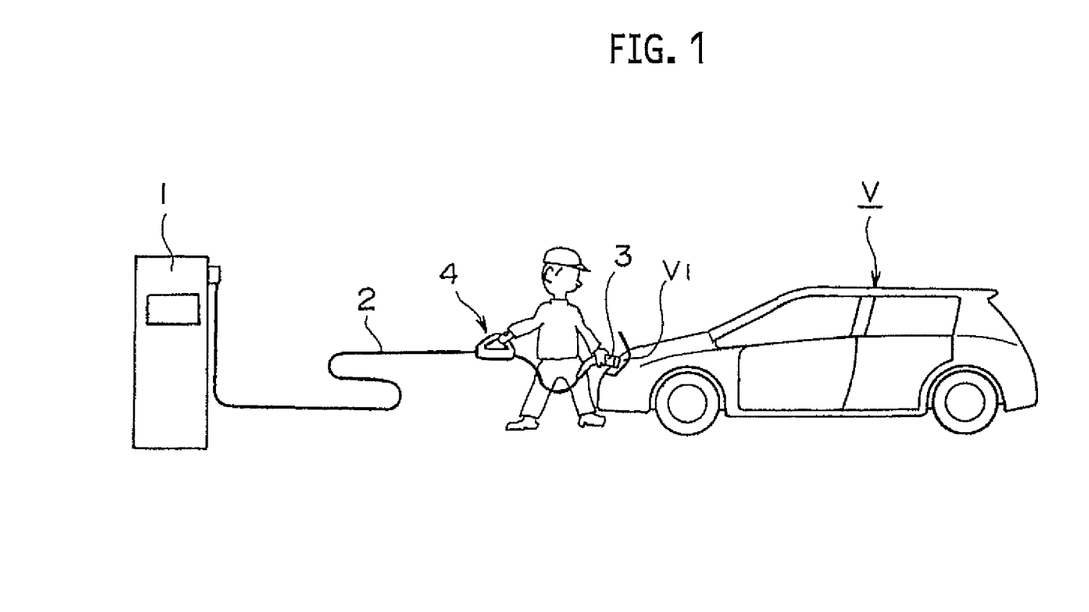
FIG. 1 is a view illustrating a situation that a middle gripper for a charging cable according to an embodiment of the present invention is used to charge a battery of a vehicle from a charging stand.

As illustrated in FIG. 1, the middle gripper 4 for a charging cable according to the embodiment of the present invention is attached to the charging cable 2 and is used to conduct a charging operation. A charging stand 1 incorporates a power conversion circuit that converts commercial AC power into DC power and steps up the same to a predetermined voltage. From a side face of a housing of the charging stand 1 installed at a charging location, the charging cable 2 is led out. Hereinafter, the middle gripper 4 for a charging cable is sometimes simplified as the "middle gripper 4".

The charging cable 2 is a power supply cable that supplies the DC power converted in the charging stand 1 to a battery of an electric vehicle through a charging connector 3 arranged at a front end of the charging cable 2. The charging cable 2 is formed by covering an electric wire with insulating material such as rubber. At the time of charging, the charging connector 3 is attached to a power supply inlet V1 of the electric vehicle V, and for example, a start button arranged on the charging stand 1 is pushed to start charging.

The charging cable 2 has a sufficient length so that it may reach the power supply inlet V1 of the electric vehicle V parked in the vicinity of the charging stand 1. For example, it generally has a length of about 10 m. When not used for charging, the charging cable 2 is wound into, for example, a spiral shape so that it interferes with nothing. The charging connector 3 is stored in a predetermined part prepared on a front face of the housing of the charging stand 1.

The middle gripper 4 according to the present embodiment is attached to the charging cable 2 extending from the charging stand 1. The middle gripper 4 is formed to pass the charging cable 2 therethrough and has a cylindrical part 41 that is put on a hook 5 arranged on the charging stand 1. The middle gripper 4 also has a gripping part 42 that extends from the cylindrical part 41 and is gripped by a charging operator.

Figure 2:
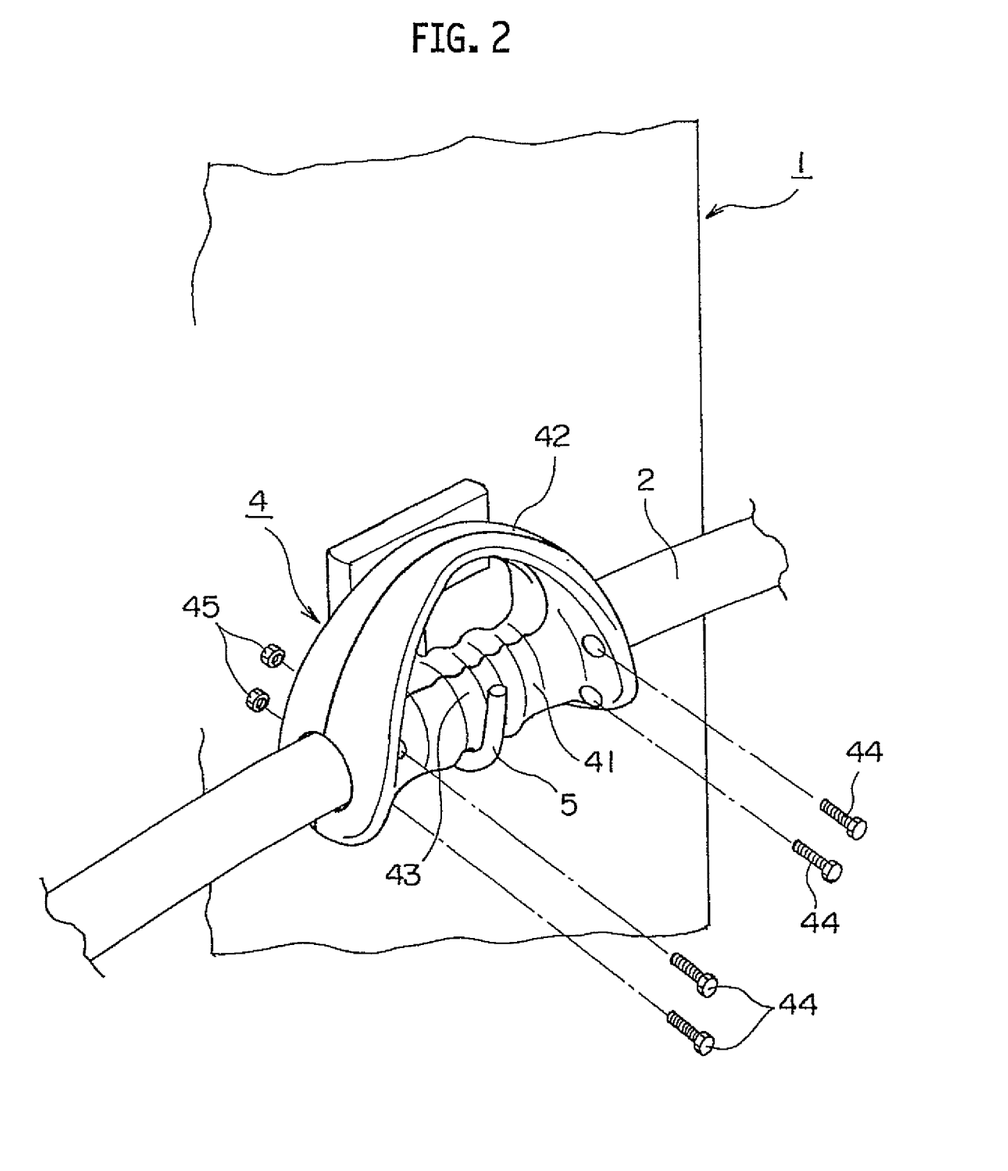
FIG. 2 is a perspective view illustrating the middle gripper for a charging cable of FIG. 1 put on a hook of the charging stand.
Figure 3:
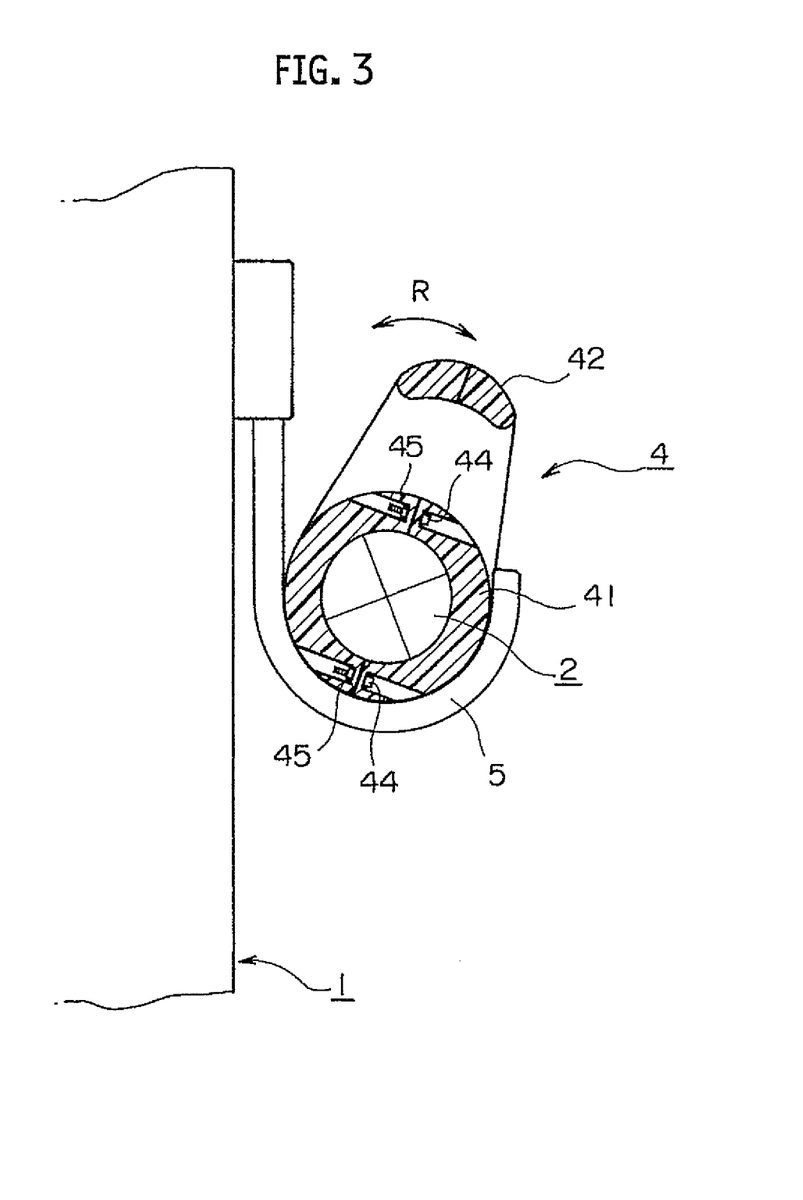
FIG. 3 is a vertical section illustrating an essential part of FIG. 2.

The middle gripper 4 may be made of insulating material such as plastics. Also, as illustrated in FIG. 2, the middle gripper 4 may be made of left and right divided members divided along an axial direction of the charging cable. Namely, as illustrated in FIGS. 2 and 3, the divided members may be fixed together with bolts 44 and nuts 45 so that the cylindrical part 41 may cover the charging cable 2 to pass therethrough. In this way, the middle gripper 4 is attached to the charging cable 2. It is naturally possible to attach the middle gripper 4 to the charging cable 2 according to prior known techniques.

When attaching the middle gripper 4 to the charging cable 2, it is necessary to consider a relationship between an inner diameter of the cylindrical part 41 and an outer diameter of the charging cable. This is achieved by adjusting a fastening state between the bolts 44 and the nuts 45. Increasing fastening force between the bolts 44 and the nuts 45 results in increasing pressing force acting on the cylindrical part 41 and charging cable 2. As the pressing force increases, frictional force acting between the cylindrical part 41 and the charging cable 2 increases. The frictional force (pressing force) acting between the cylindrical part 41 and the charging cable 2 tends to deform part of the charging cable 2 that is in contact with the cylindrical part 41. When the middle gripper 4 is attached to the charging cable 2 so as to create such deformation, the charging cable 2 may have deformed part where the frictional force (pressing force) acts and undeformed part where no frictional force (pressing force) acts. Movement of the cylindrical part 41 in the axial direction of the charging cable 2 is substantially unable to deform the undeformed part. This prevents the cylindrical part 41 from moving in the axial direction of the charging cable 2. A frictional force threshold to establish such a state is dependent on the surface characteristics of the cylindrical part 41 and charging cable 2, such as surface elasticity and frictional coefficient Namely, the surface characteristics of the cylindrical part 41 and charging cable 2 must be considered when determining the fastening force between the bolts 44 and the nuts 45. Attaching the cylindrical part 41 to the charging cable 2 in such a way results in preventing the cylindrical part 41 from moving in the axial direction of the charging cable 2.

It is preferable that the cylindrical part 41 is turnable around an axis of the charging cable 2 even when a movement of the cylindrical part 41 in the axial direction of the charging cable 2 is restricted. If the cylindrical part 41 is turnable in directions indicated with an arrow R in FIG. 3, the middle gripper 4 can be put on the hook 5 with the gripping part 42 being inclined in a direction opposite to the charging stand 1. This allows the charging operator to easily grasp the gripping part 42 at the time of next charging operation. To make the cylindrical part 41 turnable, the surface characteristics of the cylindrical part 41 and charging cable 2 must be considered like the above-mentioned case when adjusting the fastening force between the bolts 44 and the nuts 45.

Figure 4:
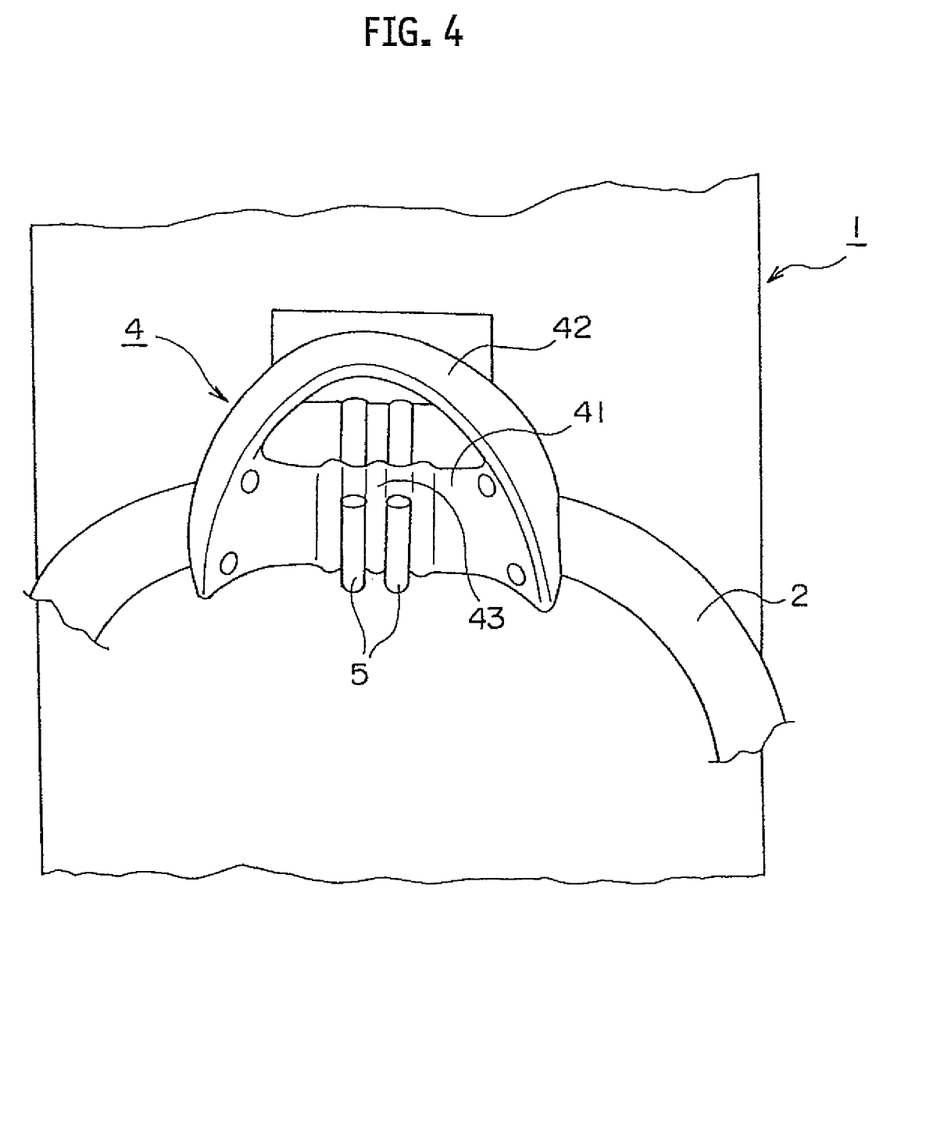
FIG. 4 is a perspective view illustrating the middle gripper for a charging cable of FIG. 1 put on another type of hook of the charging stand.

It is preferable that an outer circumferential face of the cylindrical part 41 is provided with annular irregular part 43 to receive the hook 5 when the cylindrical part 41 is put on the hook 5. The term of "annular irregular part" has irregularities that are formed in the surface of the cylindrical part 41 in an axial direction of the cylindrical part 41 with protrusions and recesses being circumferentially formed side by side. The annular irregular part 43 prevents the cylindrical part 41 from sideslipping and stabilizes the cylindrical part 41. The cylindrical part 41 may have a plurality of such annular irregular parts. It is preferable that the plurality of annular irregular parts are arranged to receive, respectively, a plurality of hooks arranged at intervals on the charging stand. This further stabilizes the cylindrical part 41. FIG. 2 illustrates an example with a single hook 5 and FIG. 4 an example with two hooks 5 spaced from each other. In FIG. 4, there are a plurality of the annular irregular parts 43 corresponding to the hooks 5, respectively. The number is not limited to two but it may be plural more than two.

The gripping part 42 has, as illustrated in FIG. 2, a shape so that the charging operator can grasp it when the cylindrical part 41 is on the hook 5. In the example of FIG. 2, the gripping part 42 is shaped to upwardly extend from each end of the cylindrical part 41 and be joined together. The shape is not limited to this. Any shape is adoptable for the gripping part 42 if the shape allows the charging operator to grasp the gripping part 42 and put the same on the hook. For example, the gripping part 42 may have a cantilever shape that upwardly extends from one end of the cylindrical part 41.

Figure 5:
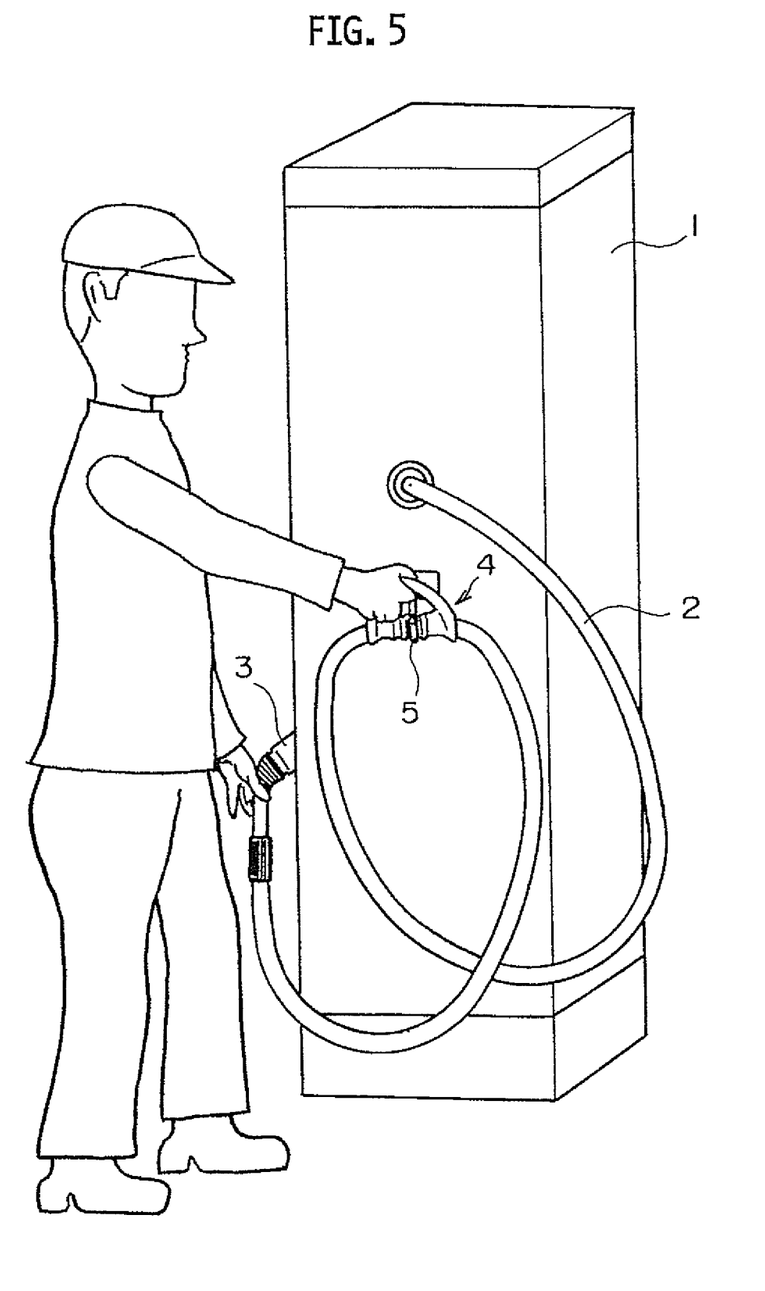
FIG. 5 is a view illustrating a charging operation using the middle gripper for a charging cable according to the embodiment of the present invention.
Figure 6:
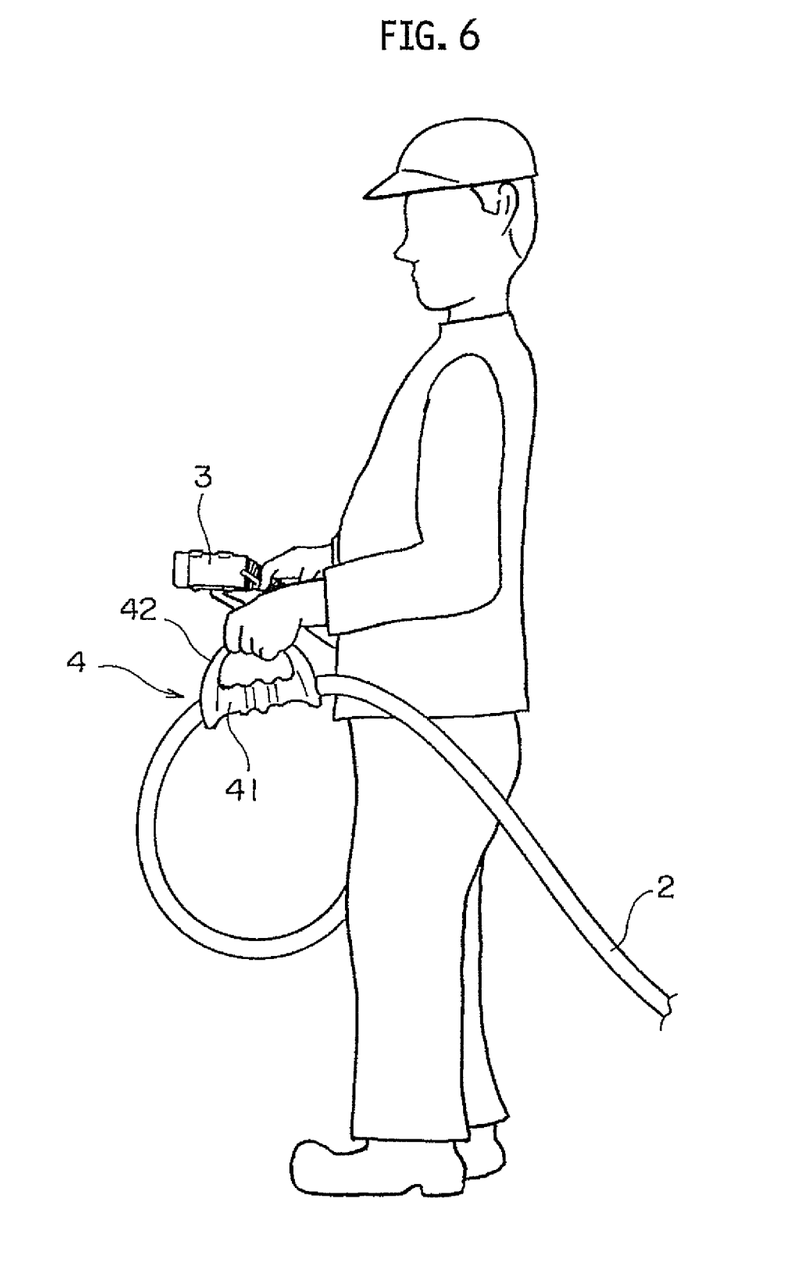
FIG. 6 is another view illustrating the charging operation using the middle gripper for a charging cable according to the embodiment of the present invention.

A charging operation will be explained. When not charging, the charging connector 3 arranged at the front end of the charging cable 2 is stored, as illustrated in FIG. 5, in the predetermined part on the front face of the charging stand 1. At this time, the cylindrical part 41 of the middle gripper 4 attached to the charging cable 2 is put on the hook 5 on the side face of the charging stand 1 and the charging cable 2 is wound in spirals.

To start charging, the charging operator removes with one hand the charging connector 3 from the predetermined part, holds with the other hand the gripping part 42 of the middle gripper 4, and removes the cylindrical part 41 from the hook 5. In this way, the charging operator holds the front end of the charging cable with one hand and grasps the charging cable with the other hand.

As mentioned above, the charging cable 2 that passes large power of high voltage is required to have a voltage withstanding characteristic corresponding to the large power and strength. Accordingly, the charging cable that satisfies such requirements tends to be thick, hard, and heavy. With the middle gripper 4 of the embodiment, the charging operator is able to efficiently hold the charging cable 2 with both hands. This allows the charging operator to easily attach the charging connector 3 to the power supply inlet V1 of the electric vehicle V. Even if the charging cable 2 is wound in spirals, the charging cable 2 can be held with the middle gripper 4 to easily cancel the twists of the charging cable 2.

Grasping the charging cable 2 with both hands, the charging operator cancels the twists of the charging cable 2 by, for example, turning himself or herself, extends the charging cable 2, and attaches the charging connector 3 to the power supply inlet V1 of the electric vehicle V. Thereafter, the charging operator removes his or her hand from the middle gripper 4 and pushes the charging start button on the charging stand 1 to start charging.

When the charging completes, the charging operator holds the charging connector 3 with one hand and grasps the gripping part 42 of the middle gripper 4 with the other hand. The charging operator removes the charging connector 3 from the power supply inlet V1, winds the charging cable 2 into spirals again, stores the charging connector 3 in the predetermined part on the charging stand 1, and puts the cylindrical part 41 of the middle gripper 4 on the hook 5.

In this way, with the middle gripper 4 according to the embodiment, the charging cable 2 that is thick, hard, and heavy improves its workability and operability so that, even if the charging operator is weak, he or she can easily carry out the charging operation. When not charging, the charging cable 2 is wound into spirals and the cylindrical part 41 of the middle gripper 4 is put on the hook 5 so that the charging cable 2 is not soiled by touching the ground.

The cylindrical part 41 of the middle gripper 4 according to the embodiment has the annular irregular part 43 that receives the hook 5 when the cylindrical part 41 is put on the hook 5. This prevents the cylindrical part 41 from dropping off the hook 5 even if some external force acts on the charging cable 2 during off charging period. Namely, stability of the middle gripper 4 on the hook 5 improves. The plurality of annular irregular parts 43 illustrated in FIG. 4 that receives, respectively, the plurality of hooks 5 arranged at intervals on the charging stand further improve such stability.

The cylindrical part 41 of the middle gripper 4 according to the embodiment is turnable around the axis of the charging cable 2 by adjusting the fastening state of the bolts 44 and nuts 45. When the middle gripper 4 is put on the hook 5, the cylindrical part 41 is turnable to the right side of the arrow R illustrated in FIG. 3. This allows the charging operator to easily grasp the gripping part 42 at the next charging operation.

Although the present invention has been explained according to the embodiment, the present invention is not limited to the explained embodiment but, as is apparent for persons skilled in the art, it allows various modifications and improvements.

The middle gripper for a charging cable according to the present invention allows a charging operator to grasp the charging connector with one hand and the middle gripper attached to the charging cable with the other hand and conduct a charging operation. This improves operability of the charging operation.

The invention claimed is:

1. A middle gripper of a charging cable, attached to the charging cable extending from a charging stand, comprising:

a cylindrical part formed to pass the charging cable therethrough and to be turnable around an axis of the charging cable and put on a hook arranged on the charging stand;

a gripping part formed extending from the cylindrical part for grasping; and adjusting means that adjusts frictional force between the cylindrical part and the charging cable such that a deformation is formed in the charging cable that prevents axial movement of the cylindrical part while allowing rotational movement.

2. The middle gripper of a charging cable according to claim 1, wherein the cylindrical part has an annular irregular part with a recess sized to receive the hook into the recess when the cylindrical part is put on the hook.

3. The middle gripper of a charging cable according to claim 2, comprising a plurality of the annular irregular parts being arranged to receive, respectively, a plurality of the hooks arranged at intervals on the charging stand.

* * * * *